United States Patent Office

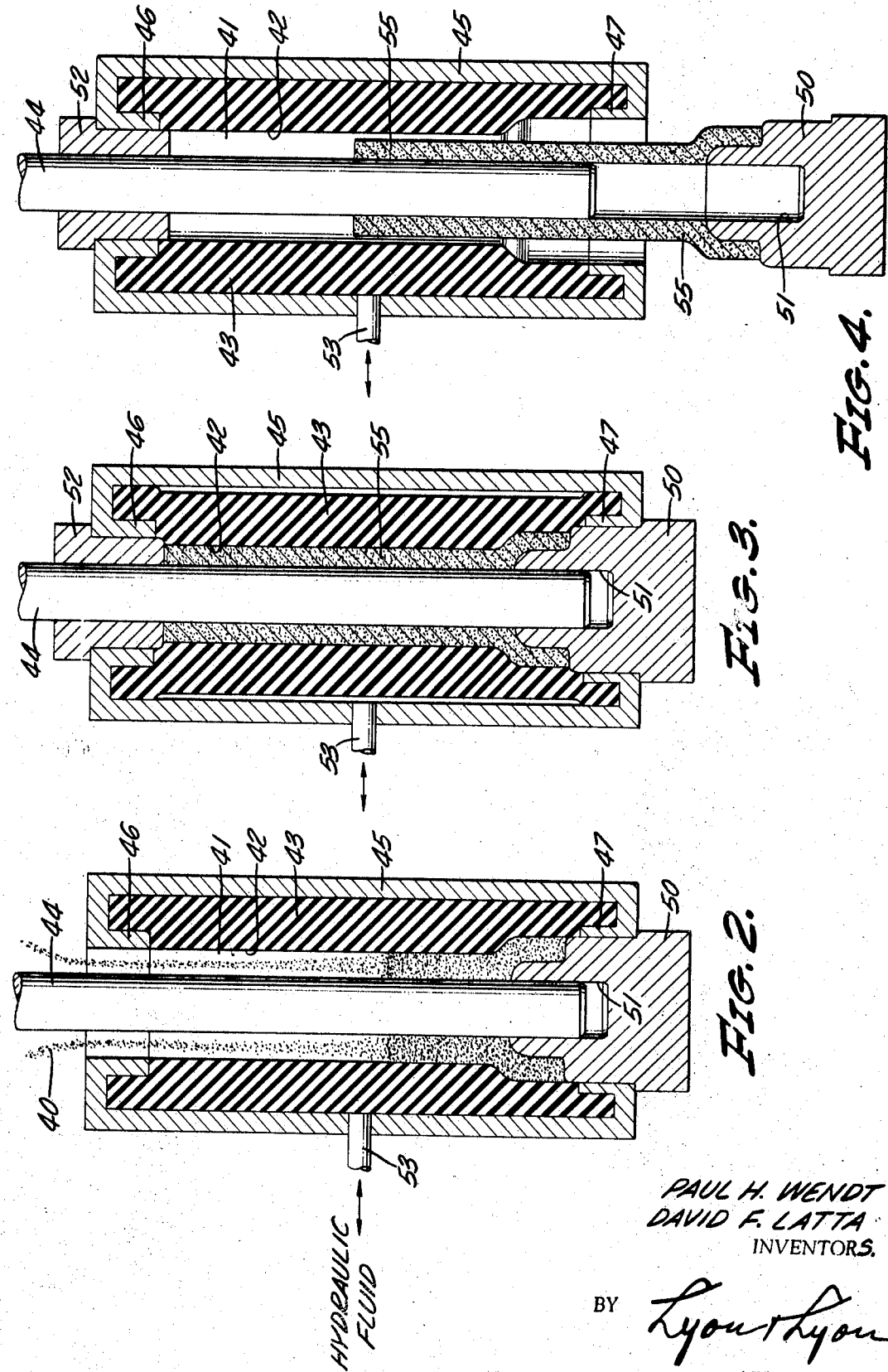

3,558,758
Patented Jan. 26, 1971

3,558,758
PROCESS FOR PREPARING CERAMIC CLAY GRANULES
Paul H. Wendt, Arcadia, and David F. Latta, Long Beach, Calif., assignors to Pacific Clay Products, Los Angeles, Calif., a corporation of California
Continuation of application Ser. No. 392,718, Aug. 28, 1964. This application May 10, 1967, Ser. No. 637,439
Int. Cl. C04b 33/04, 33/20; B29b 1/02
U.S. Cl. 264—108                                          1 Claim

ABSTRACT OF THE DISCLOSURE

Clay particles of micron or submicron size and containing 5 to 10 percent moisture are fed into one end of a confining passage by applying shear forces thereto, under pressure, in a direction transverse to the passage, which compacts the clay by orienting the microscopic clay "flakes" so that they lie substantially in parallel direction, and such orientation is maintained as the clay is pushed along the passage which is of uniform sectional area and shape. At the other end of the passage the compacted clay is deflected radially outwardly in all radial directions to break the mass up into chunks or bodies without disturbing the orientation of the flakes in the bodies. These chunks are then further broken up into granules without disturbing the interior particle orientation for use in forming desired shapes by isostatic pressing.

CROSS REFERENCE TO RELATED APPLICATION

This application is a continuation of our copending application Ser. No. 392,718, filed Aug. 28, 1964, now abandoned.

BACKGROUND OF THE INVENTION

It is known that ceramic articles formed by the dry-press method achieve greater strength after firing when the raw ceramic materials have been ground to micron or submicron-size particles prior to the dry-pressing step. However, ceramic clays and other raw materials are difficult to handle when in the powdered form, because they are not free-flowing and will not readily fill the mold chamber in which the dry-press forming is to be accomplished. They do not possess the constant specific volume necessary to achieve uniform density and dimensional stability in the dry-press formed product.

Accordingly, it has been customary to compact the powdered raw materials into granules before feeding the raw materials into the dry-press forming mold. Various techniques have heretofore been employed to produce such granules. Among the techniques used have been spray-drying, the use of balling drums, roller compaction with subsequent granulation of the rolled sheet or flakes, wet extrusion of pellets and the formation of granules from compacted cake in a muller mixer. Each of these prior-art granulating processes has certain disadvantages.

Spray drying is a set process wherein the fine particles of the raw material are wetted to form a slip or slurry to permit spraying. The granules formed by this process are normally in the 60-mesh range, and larger granule diameters cannot readily be obtained. Drying of the large amount of water required to suspend the material in a slurry, coupled with the necessary additions of dispersing agents to prevent settling, makes this process a costly one. The equipment available for carrying out this process is limited in capacity and therefore is not suitable for the production of large-volume, low-cost ceramic ware, such as, for example, vitrified pipe for sewer lines.

The formation of granules in balling drums is a semi-wet process. The granules are formed from small seed pellets and roll to larger diameters by gathering loose particles by centrifugal force while rolling in the rotating drum. This method does not permit control over the density of the granules which are formed, and such control is necessary in order to obtain the desirable consistent properties in the finished ceramic product. Also, granules prepared by this balling-drum method are normally too large for the subsequent dry-process forming process. Moreover, the moisture required for balling is higher than that required for dry-press forming, necessitating a drying operation following the granulation step.

The roller compaction process is a dry process, but it has the disadvantage that excessive compaction pressures are required in the small contact area between the rolls in order to obtain particle orientation. The high pressures result in formation of high-density granules that cannot readily be crushed in the subsequent dry-press forming process.

The principal disadvantage of the process of wet extrusion of pellets is that it affords no control over granule density. The density produced is normally excessively high, such that subsequent forming pressures cannot completely crush the granules into a homogeneous structure. This results in a coarse-textured product that is weak and is highly permeable to water and air. This set extrusion method also requires an additional drying step to reduce the moisture to forming requirements. Drying granules to some predetermined level of moisture presents a difficult problem of control. As a result, wet auger extrusion is not suitable for the preparation of materials for dry forming of low-cost, high-strength products.

The muller mixer process is a dry process most commonly used in the ceramic industry to prepare raw materials for dry forming. This method utilizes two large weighted wheels, sometimes spring-loaded, revolving in a circular pan. As the wheels rotate over the raw material to be granulated, the forces produced tend to compact and distribute the moisture by a wedging effect. The forces are relatively low, and the material is poorly directed into the compacting wheels. Considerable time is therefore required to produce satisfactory compacted granules from particles orientated towards optimum packing arrangements. As a result, the muller process is essentially a batch process.

SUMMARY OF THE INVENTION

The principal objects of the present invention are to provide an improved process and apparatus for making granules for dry-press or isostatic forming, to provide improved granules from which a novel ceramic product may be formed and to provide an improved ceramic product after firing. In brief, these objects are accomplished by first grinding the raw material to micron or submicron size in the dry state. Water is mixed with the powdery dry clay or other ceramic material to produce the optimum physical and chemical characteristics in the forming of the dry-pressed product. Uniform dispersion of the water and proper orientation of the minute flake-like particles are achieved by forcing the imperfectly blended material by means of a screw conveyor through a confining passageway by applying shear forces in a plane radial to the passageway, which passageway has a discharge end which is constructed so that the degree of compaction is controlled. The material is broken into segments of the desired size by deflecting it radially outwardly of the discharge end, in all directions, broken into granules dry-pressed to form a length of pipe, and fired.

BRIEF DESCRIPTION OF THE DRAWINGS

In the drawings.

FIGS. 2, 3, and 4 show steps in the dry-pressing operation.

Figure 1:
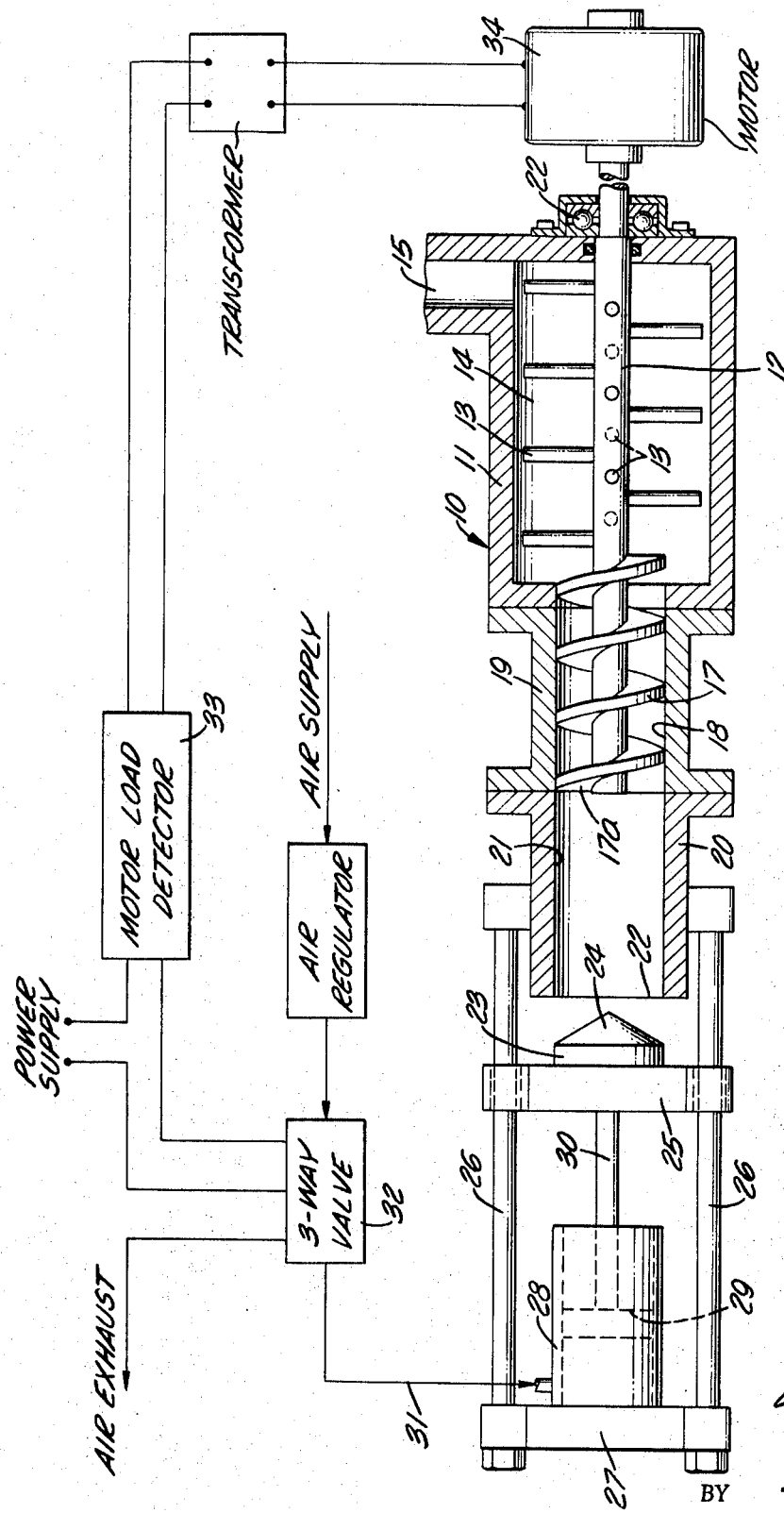
FIG. 1 shows a schematic view partly in section, illustrating a preferred form of apparatus for carrying out the new method of preparing the granules.

Referring to the drawings, the mixer device 10 includes a stationary housing 11 having a motor-driven shaft 12 mounted therein. Radial pins 13 are mounted on the shaft 12 and project into the mixing chamber 14. Powdered dry material, and water or other additive, are introduced into the mixing chamber 14 through the inlet 15. The moisture content of the mixture should be between five and ten percent for optimum dry-pressing results.

A continuous screw-type auger 17 is also fixed on the power-driven shaft 12 and extends into or otherwise communicates with the mixing chamber 14. This auger screw 17 turns within a bore 18 provided on the housing extension 19. A granulation or compaction die 20, defining a cylindrical passageway, is fixed to the housing extension 19 and is provided with a bore 21 which is in axial alignment with the bore 18. The bore 21 is open at both ends. When the shaft 12 is rotated, the pins 13 mix the material in the chamber 14, and the auger screw 17 moves the material from the mixing chamber 14 into the bore 21 of the compaction cylinder 20. A thrust bearing 22 is provided on the shaft 12. The forward end 17a of the screw 17 is full diameter and therefore serves to apply high shear forces progressively to a thin layer of the clay material over a large area, as the material is forced into the compaction die 20 thus orienting the minute flakes of the material to lie in a transverse plane radial to the axis of the compaction die 20, in successive thin layers.

Means are provided to resist the discharge of material from the bore 21, and, as shown on the drawings, this means includes a retaining disk 23 having a forward conical surface 24. The disk is supported for axial movement concentrically of the exit opening 22 of the bore 21. The disk 23 is supported on a crosshead 25, mounted for sliding movement on the parallel bars 26 which are fixed to the compaction die 20 and to the stationary backstop 27. An air cylinder 28 is fixed to the backstop 27 and has a piston 29 movable axially therein. The piston rod 30 connected to the piston 29 is also connected to the crosshead 25 and disk 23. Air under pressure is admitted into the air cylinder 28 behind the piston 29 by means of the pressure pipe 31. The intensity of air pressure delivered to the cylinder 28 through the pipe 31 is controlled by the three-way valve 32. This three-way valve, in turn, is electrically controlled by means of the motor-load detector 33, interposed in the power supply to the electric motor 34 which drives the shaft 12. When the pressure rises at the discharge end 22 of the bore 21, the driving motor 34 draws more current, and this is reflected through the detector 33 to move the three-way valve parts in a direction to decrease the air pressure in the cylinder assembly 28, thereby moving the retaining disk 23 away from the compaction die 20. This increases the ring area through which radial discharge of the material occurs between the disk 23 and the discharge end 22 of the die 20. Conversely, if the pressure at the discharge end 22 of the bore 21 decreases, the load on the motor 34 decreases and the detector 33 causes the parts of the three-way valve 32 to increase the air pressure delivered to the cylinder 28. This moves the disk 23 toward the compaction die 20, thereby restricting the ring area through which discharge of material occurs from bore 21. The pressure in the air cylinder 28 thus controls the degree of compaction of the material leaving the die 20. The length of the compaction cylinder 20 may be adjusted according to the friction characteristics of the material to be compacted.

The compacted material issues radially in all directions from the circumferential area between the end of the compaction cylinder 20 and the retaining disk 23 in the form of circular segments that are approximately equal in thickness to the thin layers referred to as being produced by the displacement of the auger for each revolution of the auger screw 17. These segments are composed of many thin plate-like, flat pieces created by the high shear forces as the material is compacted at the auger tip 17a. It is to be remembered that the radial orientation given the particles by the auger is maintained as the material moves along the die 20 because the latter is of uniform cross-sectional area. Thus the segments are discharged radially without disturbing the relative orientation of the particles constituting each segment. We have determined by means of an electron microscope that the micron-size particles are anisometric and tend to align themselves for close packing arrangement when compacted in this manner. As the length of the compaction cylinder 20 is increased and as the pressure in the air cylinder 28 is increased, the degree of compaction and density of the plate-like pieces also increases.

If the rotational speed of the auger 17 is increased, while holding the length of the compaction cylinder 20 and the air pressure constant, there is produced compacted material in which the density increases, but the alignment of the usually anisometric micron-size particles is improved.

The relatively thick segments issuing from the compaction cylinder are subsequently broken up into granules of the desired size for dry-pressing. No drying step is required.

The granules 40, containing five to ten percent moisture, are then used in the dry-press method diagrammatically illustrated in FIGS. 2, 3, and 4. The granules are poured into a mold cavity 41, defined between the cylindrical bore 42 of an elastomeric sleeve 43 in the outer surface of a central metallic mandrel 44. A sleeve is mounted within a metallic shell or housing 45. The skirts 46 and 47 on the shell 45 secure the ends of the elastomeric sleeve 43 in position. A lower plug 50, which is axially movable, has a central opening 51 which slidably receives the lower end of the mandrel 44.

When the mold cavity 41 has been filled with granules 40, the upper plug 52 is placed in position around the mandrel 44 to close the upper end of the mold cavity. Hydraulic fluid under pressure is then admitted through the fitting 53 into the interior of the shell 45 to cause the elastomeric sleeve 43 to compress the granules 40 isostatically and to form the length of dry-pressed pipe 55 as shown in FIG. 3. During the hydraulic contraction of the elastomeric sleeve 43, the plugs 52 and 50 are held against outward axial movement by means not shown.

The hydraulic pressure is then vented through the fitting 53 to allow the elastomeric cylinder 43 to expand away from the length of dry-pressed pipe 55. The dry-pressed pipe has sufficient spring-back when the external pressure is released to provide clearance around the stationary mandrel 44. The plug 50 is then lowered axially, and the dry-pressed pipe 55 descends by gravity along with the plug 50 which supports it. The stationary mandrel 44 remains in place. The dry-press pipe 55 is then placed on a kiln car and passed through an oven in the conventional manner to vitrify the pipe.

We have found that the quality of the ceramic product, after dry-pressing and firing, is measurably improved by the compaction method just described, because the creation of flaws or cracks in the finished article is minimized.

The following is an explanation of how and why this improved granulation process results in a superior product.

After the article has been dry-pressed or formed, it is heated or fired in a kiln to some desired temperature to develop sufficient liquid to bond the particles together. For satisfactory heating, the amount and the viscosity of the high temperature liquid phase must be such that densification, which takes place during firing, occurs in a reasonable time without the ware slumping or deforming under the force of gravity. This is particularly critical in large objects, such as clay pipe, where dimensional stability is important. The controlling force for densification during firing is the surface tension or surface energy of the wetting liquid. The rate of densification and coincidental shrinkage is directly proportional to the surface tension of the liquid formed and inversely proportional to the viscosity and the pore size (pore size is a measure of the voids left between the particles by imperfect compaction). Surface tension, viscosity, and particle or pore size are the three main controlling factors governing bonding or densification. For sewer pipe materials made from clay silicates, surface tension is not measurably changed by composition. Also, the amount of liquid and the viscosity must be limited to prevent deformation of the formed article during firing. Thus, particle size or pore size has a strong effect on sintering rate and must be closely controlled in order to produce a satisfactory product. Best results are obtained by using fine ground materials of uniform size distribution. This results in a pressed article containing very small pores of essentially equal radius. The article will then bond or shrink uniformly without creating defects or flaws during firing.

Products formed from common clays, however, have a large distribution of particle sizes, aggravated by the plate shap of fine micron-size clay. This condition normally results in a large variation in the pore size distribution throughout the pressed product. Due to the high molecular attractive forces of the fine clay particles and the restricted movement of these particles in the pressing operation, it is not possible to orient these particles in an efficient packing arrangement during the pressing operation to reduce pore size distribution. With the first formation of a liquid phase, during firing, the particles rearrange themselves under the influence of surface tension toward more efficient packing. The solid particles move together under the effect of surface tension as soon as the pore has been completely surrounded or wetted by the liquid. Voids or flaws are created where the particles are more widely spread. The smaller radius pores will shrink first, pulling away from the larger pore spaces. As more liquid is formed, more particles pull away from the larger pores, increasing the size of these pores. If the pore size distribution is large, the larger pores will increase in size and interconnect, creating large voids or flaws substantially reducing the strength and increasing the air and water permeability of the pressed product.

In the compaction process embodying this invention, high shear forces are applied to a relatively thin layer of clay material, over a large area, and compel orientation of the particles and clay platelets toward efficient packing arrangements. As a result, the pore size distribution is effectively reduced, and there is less particle rearrangement during the formation of the liquid phase during firing. Granules prepared in this method have effectively minimized or prevented the development of flaws and defects in the finished product after firing.

As described above, our new process of preparing granules for dry-press forming produces ceramic products which are superior to products produced from granules made by any other method known. The thin-wall high-strength pipe produced by this process has an outside-diameter to wall-thickness ratio of at least 13 to 1. This new thin-wall pipe produced from the same materials as are used in the conventional extruded pipe attains a modulus of rupture in excess of 6,000 p.s.i. This high-strength thin-wall vitrified clay pipe is from one and one-half to two times as strong as pipe made from the same raw materials, when produced by the conventional extrusion process. Moreover, this high-density thin-wall pipe has a specific gravity of 2.4 or greater, and has 20 percent to 40 percent lower water absorption than conventional extruded clay pipe. ASTM standards for absorption of water in vitrified clay pipe requires that the absorption be less than eight percent. This new process, using the same raw materials, gives an absorption for water of only three percent to four percent.

Conventional extruded clay pipe has planes or lines of weakness caused by the laminar flow through the extrusion die, but the pipe produced by the isostatic process is uniform and free of any planes or lines of weakness.

Clay pipe made in accordance with the present process permits substantially greater flexibility in the selection of raw materials. Furthermore, by varying the composition of the raw material, the resulting pipe can be made impermeable to water or air, whereas this is impossible with the conventional extruded pipe. Pipe made in accordance with the present invention reduces the total shrinkage by fifty percent to eighty percent, as compared with conventional extruded clay pipe, with consequent improvement in size and dimensional tolerances. The low cost of this compaction process enables the dry-press forming technique to be used in commercial manufacture of low-cost, high-volume ceramic products, such as vitrified clay pipe, bricks, blocks, and tile.

Having fully described our invention, it is to be understood that we are not to be limited to the details herein set forth, but that our invention is of the full scope of the appended claim.

We claim:

1. The process of compacting clay material to form granules suitable for isostatic pressing of clay pipe, comprising the steps of: grinding raw clay-bearing material to micron or submicron size in the dry state, adding only sufficient moisture to the dry ground material to produce a total moisture content of 5 to 10 percent, feeding the material into the inlet of a compaction passageway, applying high shear forces to the material at the passageway inlet in a direction transverse to said passageway to a relatively thin layer of said material over a large area, while controllably applying a back pressure to the material at the other end of the compaction passageway, to achieve optimum density of the material and to compel orientation of the minute mineral particles of the material toward an efficient packing arrangement in which the particles are oriented in a transverse plane radial to the axis of the compaction die in successive thin layers, said passageway being of uniform cross-sectional area and shape, breaking up the compacted material emerging from the passageway to form segments without disturbing the orientation of said minute mineral particles within each segment, and subsequently breaking up the segments into composite granules, without disturbing the orientation of said minute mineral particles within each granule.

References Cited

UNITED STATES PATENTS

| | | | |
|---|---|---|---|
| 621,212 | 8/1899 | Breitschwerth | 264—Clay Treatment |
| 1,533,191 | 4/1925 | Kaiser et al. | 18—12(SA) |
| 2,289,264 | 7/1942 | Hawk | 25—14X |
| 2,522,982 | 9/1950 | Bassett | 264—141 |
| 2,611,941 | 9/1952 | Leitl | 25—14 |
| 2,642,643 | 6/1953 | Montague | 25—14 |
| 2,857,624 | 10/1958 | Hanzel et al. | 264—141 |
| 3,111,739 | 11/1963 | Horton et al. | 264—108X |
| 3,193,900 | 7/1965 | Wendt | 264—314X |
| 3,222,746 | 12/1965 | Tucakoric | 25—14 |
| 3,324,510 | 6/1967 | Kleeb | 264—141 |
| 1,920,773 | 8/1933 | Walton | 264—56 |

(Other references on following page)

OTHER REFERENCES

J. G. Seanor, "Laminations—What Causes Them in Clay Products," an article appearing in the April 1963 issue of Brick & Clay Record at pages 80–81, 113–114 and in the May 1963 issue at pages 52–53, 62–63, and 115.

P. P. Budnikov, The Technology of Ceramics & Refractories, 1964, The M.I.T. Press, Cambridge, Mass., pp. 90–91 and 93.

W. D. Kingery (Ed.), Ceramic Fabrication Processes, 1958, John Wiley & Sons, Inc., New York, pp. 65 and 70–72.

A. E. Dodd, Dictionary of Ceramics, 1964, Philosophical Library Inc., pp. 248, 102–103, and 90–91.

JULIUS FROME, Primary Examiner

J. H. MILLER, Assistant Examiner

U.S. Cl. X.R.

18—12; 23—313; 25—14; 264—56, 118, 314